(12) United States Patent
Pinto et al.

(10) Patent No.: US 10,231,024 B2
(45) Date of Patent: Mar. 12, 2019

(54) SELECTIVELY INCORPORATING FEEDBACK FROM A REMOTE AUDIENCE

(71) Applicant: Blizzard Entertainment, Inc., Irvine, CA (US)

(72) Inventors: Errol Pinto, Irvine, CA (US); John Bennett, Irvine, CA (US); David Ting, Irvine, CA (US)

(73) Assignee: BLIZZARD ENTERTAINMENT, INC., Irvine, CA (US)

( * ) Notice: Subject to any disclaimer, the term of this patent is extended or adjusted under 35 U.S.C. 154(b) by 0 days.

(21) Appl. No.: 14/025,540

(22) Filed: Sep. 12, 2013

(65) Prior Publication Data

US 2015/0074698 A1 Mar. 12, 2015

(51) Int. Cl.
| | | |
|---|---|---|
| H04N 7/173 | (2011.01) | |
| H04N 21/475 | (2011.01) | |
| H04N 21/236 | (2011.01) | |
| H04N 21/658 | (2011.01) | |

(52) U.S. Cl.
CPC ... *H04N 21/4756* (2013.01); *H04N 21/23614* (2013.01); *H04N 21/6582* (2013.01)

(58) Field of Classification Search
CPC ......... H04N 21/23614; H04N 21/4756; H04N 21/6582
USPC ................................ 725/105, 113, 131, 133
See application file for complete search history.

(56) References Cited

U.S. PATENT DOCUMENTS

| | | | | |
|---|---|---|---|---|
| 2007/0028272 A1* | 2/2007 | Lockton | ........................ | 725/62 |
| 2008/0005761 A1* | 1/2008 | Repasi et al. | .................. | 725/13 |
| 2008/0040748 A1* | 2/2008 | Miyaki | ................ | G11B 27/036 725/46 |
| 2009/0089838 A1* | 4/2009 | Pino, Jr. | ................. | G06Q 30/02 725/40 |
| 2010/0251173 A1* | 9/2010 | Imanishi | ............ | H04N 7/17318 715/810 |
| 2011/0219394 A1* | 9/2011 | Lueth et al. | ..................... | 725/24 |
| 2011/0239136 A1* | 9/2011 | Goldman et al. | ............. | 715/757 |
| 2011/0263332 A1* | 10/2011 | Mizrachi | ................. | A63F 13/12 463/42 |
| 2012/0204202 A1* | 8/2012 | Rowley | ................... | A63F 13/52 725/12 |
| 2013/0097632 A1* | 4/2013 | Shah | ................. | G06F 17/30029 725/32 |
| 2013/0097635 A1* | 4/2013 | Yerli | .................. | H04N 21/2187 725/37 |
| 2016/0193530 A1* | 7/2016 | Parker | ..................... | A63F 13/65 463/29 |
| 2017/0230730 A1* | 8/2017 | Casey | ................ | H04N 21/8549 |

* cited by examiner

*Primary Examiner* — Farzana Hossain

(74) *Attorney, Agent, or Firm* — Hickman Palermo Becker Bingham LLP

(57) ABSTRACT

A method, apparatus, and stored instructions are provided for selectively incorporating feedback from a remote audience into live content. The feedback is incorporated into one part of a segment at the same time that another part of the segment is played to an audience. A feedback manager may receive feedback from audience members on a first part of the segment while a second, later part of the segment is being played to the audience by a client machine and while a third, even later part of the segment is being generated by a content manager. The feedback manager may then compare feedback data to stored criteria to determine whether or not to change the playing content.

24 Claims, 8 Drawing Sheets

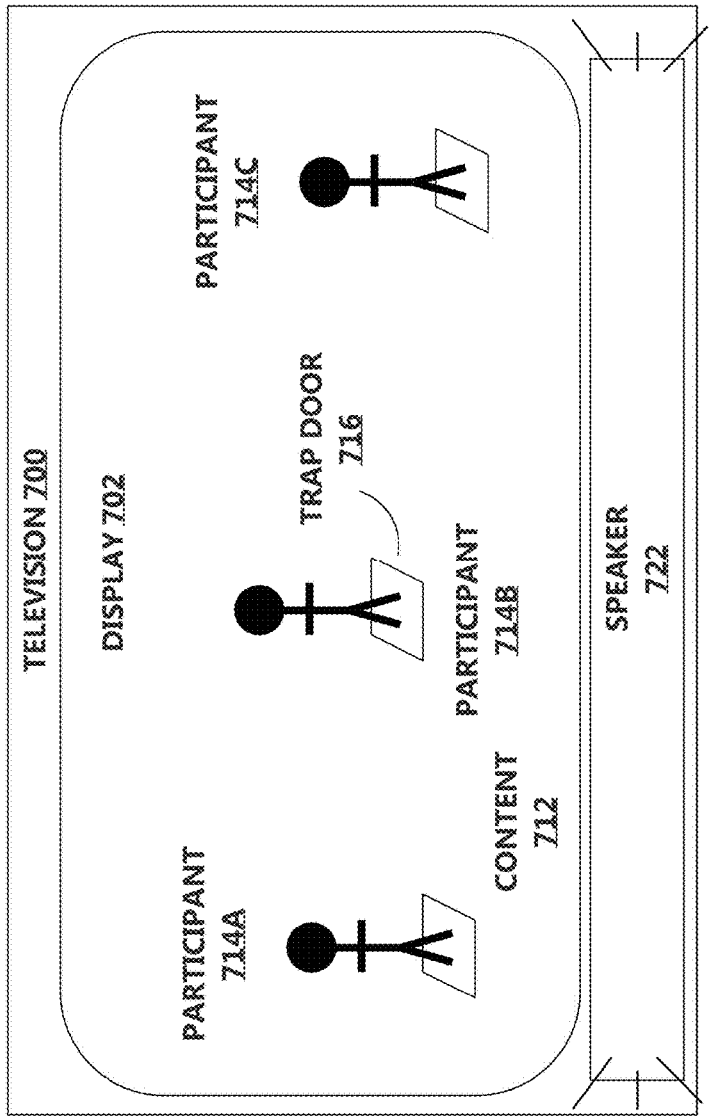
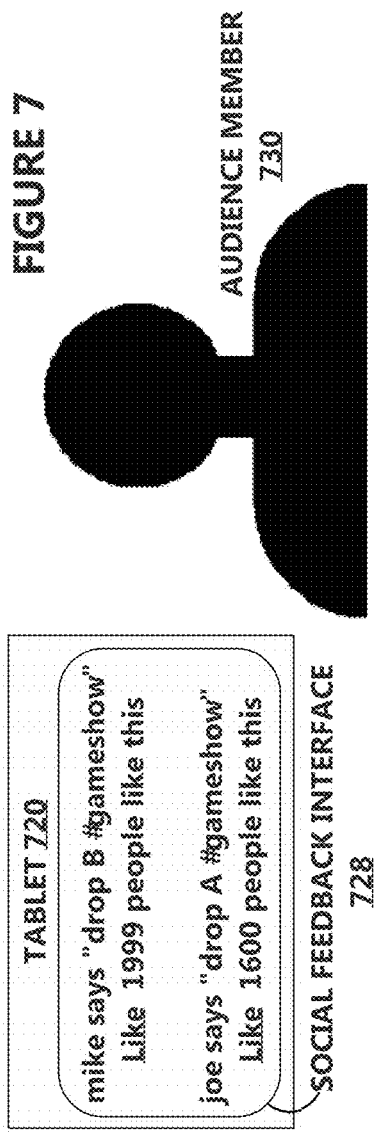
FIGURE 7

SELECTIVELY INCORPORATING FEEDBACK FROM A REMOTE AUDIENCE

FIELD OF THE INVENTION

The present invention relates to selectively incorporating feedback from a remote audience.

BACKGROUND

Gameshows, sports and eSports, reality shows, live broadcasts, and live streaming media are popular sources of entertainment for audiences. These sources of entertainment rely on a segment of video and/or audio content that is generated by capturing aspects of a physical and/or virtual environment. Parts of the segment or edited forms of the segment are transmitted from a content provider to a client machine, such as a television, desktop computer, laptop, smart phone, tablet, or radio. Members of an audience consume the transmitted parts of the segment by watching and/or listening to the parts on the client machine.

For live broadcasts or streams, an event that occurs in a physical or virtual environment is typically delayed at least a few seconds between the actual occurrence in the environment and the time that content depicting the occurrence is presented by the client machine. Common delays between event occurrence and event presentation are due to generation time, processing time, and transmission time. Some content providers also add intentional delays to live broadcasts or streams. Intentional delays may be added arbitrarily or, for example, to allow ample time for filtering profanity, violence, and adult content, or for other forms of editing. In light of intentional and unintentional delays, a "live" segment of content, as the term is used herein, refers to any contiguous segment of content for which at least part of the segment is being generated concurrently as the same or other part(s) of the segment are being played to an audience.

Reality shows such as American Idol™, The Voice™, Dancing with the Stars™, and America's Got Talent™ have popular live television segments that are well-known to American audiences. These shows occasionally prompt the audience to take action. For example, in a first segment, a show may present alternative participants or competitors, such as singers, dancers, or other performers, on which the audience can vote after the segment. The show may then air a later segment, such as a segment on the next day or next week. In the later segment, the show may announce, based on the votes that were cast between the first segment and the later segment, which participants or competitors were eliminated and which participants or competitors have advanced to the next round. These shows receive a large number of votes from the audience even though audience members are forced to wait until a later segment to see the results of their votes.

Audiences may also watch eSports, which are publicized or shared competitions between video game participants. Starcraft™ competitions are perhaps the most popular and well-developed eSports of the last decade. In Starcraft II™, observers may join a game instance to watch and listen to a competition between two game participants, as the game instance occurs. Although the observers themselves do not participate in the gameplay, the observers may chat with each other about the events of the game. As a result, the game instance may be more entertaining for the observers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 6 and 7 illustrates example interfaces for viewing content, providing feedback, and viewing changed content.

DETAILED DESCRIPTION

Figure 1:
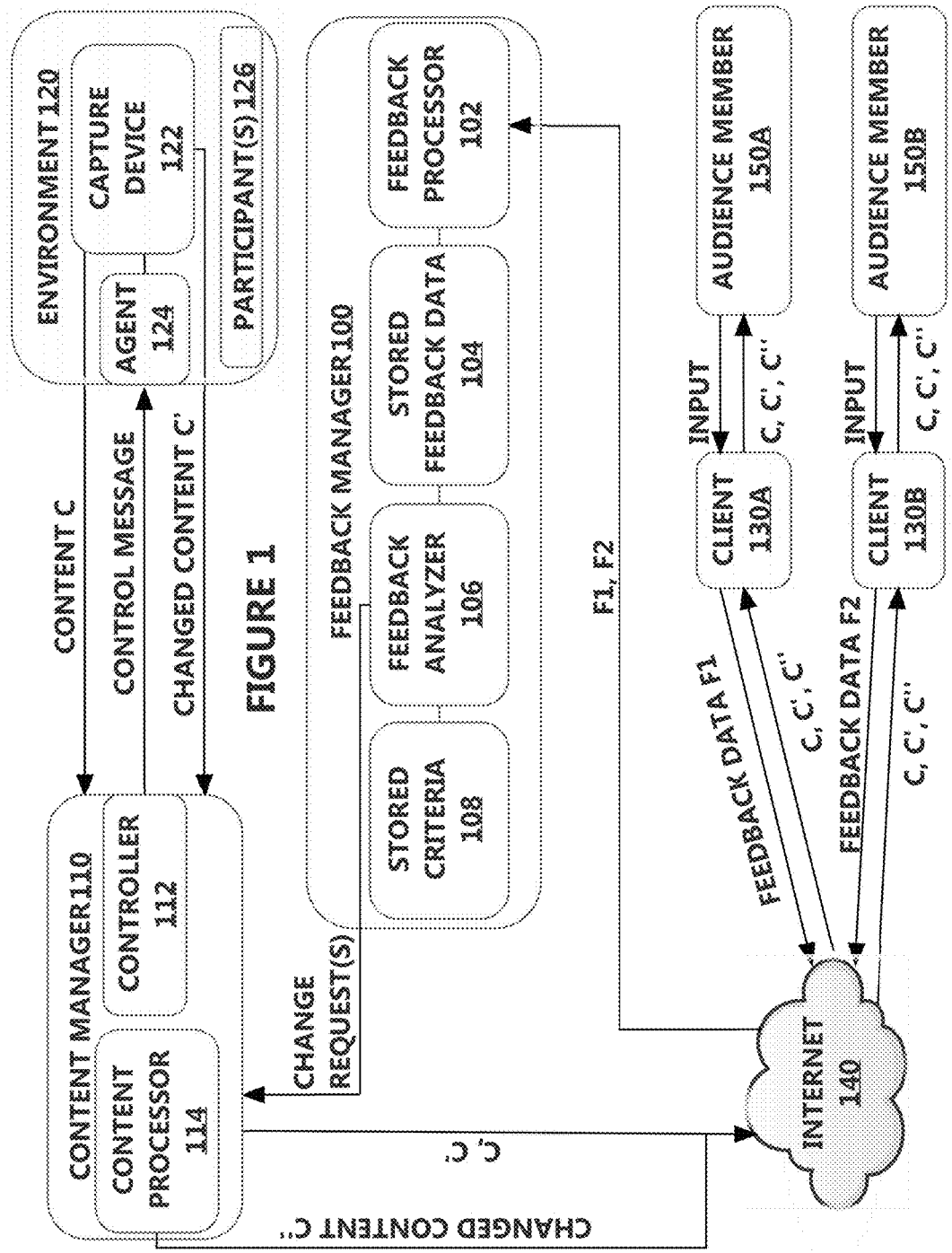
FIG. 1 illustrates an example server-side system for managing feedback from an audience and changing content that is played to the audience.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As used herein, the terms "first," "second," "third," and "particular" are used as naming conventions to distinguish different entities, such as different audience members, different participants, or different items of feedback, from each other, so that these different entities may be referenced after they have been introduced. The use of these terms does not imply an ordering or any other characteristic of the entities.

General Overview

Systems, methods, and stored instructions are provided herein for selectively incorporating feedback from a remote audience into live content. In other words, the systems, methods, and stored instructions incorporate feedback into one part of a segment at the same time that (i.e., concurrently as) another part of the same segment is played to an audience. For example, in a 60 minute show, a feedback manager may receive feedback from remote audience member(s) on the first 20 minutes of the show while (a) the second 20 minutes of the show are being played to the audience by client machines, and (b) the third 20 minutes of the show are still being generated by a content manager. In the example, the first part, the second part, and the third part are each 20 minutes. However, the actual time difference between the segment part for which feedback is being received and the segment part that is currently being generated may be minutes, seconds, or even milliseconds.

In one embodiment, one or more specially configured computing devices comprise a feedback manager for selectively incorporating feedback from a remote audience. While content of a segment is concurrently generated and played to an audience, the feedback manager receives feedback data and determines whether or not to cause a change in the content of that same segment. The feedback data represents "items of feedback" on a played portion(s) of the segment. For example, the items of feedback may include the pushing of a "thumbs up" button by a first audience member and the capture of a particular sound (e.g. a laugh or clap) from a second audience member. The different audience members may be at locations that are remote relative to each other and relative to the location at which the segment is being generated.

The feedback manager uses stored criteria to make the determination of whether or not to cause the change. Whether the stored criteria is satisfied is based, at least part, on the feedback data. For example, the stored criteria may account for both the button push of the first audience member and the captured sound of the second audience member. If the feedback manager determines to make the change, the feedback manager may cause the change to be performed on the currently-being-generated portion of the segment. The change may be made by a content manager that is responsible for making on-the-fly changes to the content.

On-the-Fly Content Revision Example

Figure 5:
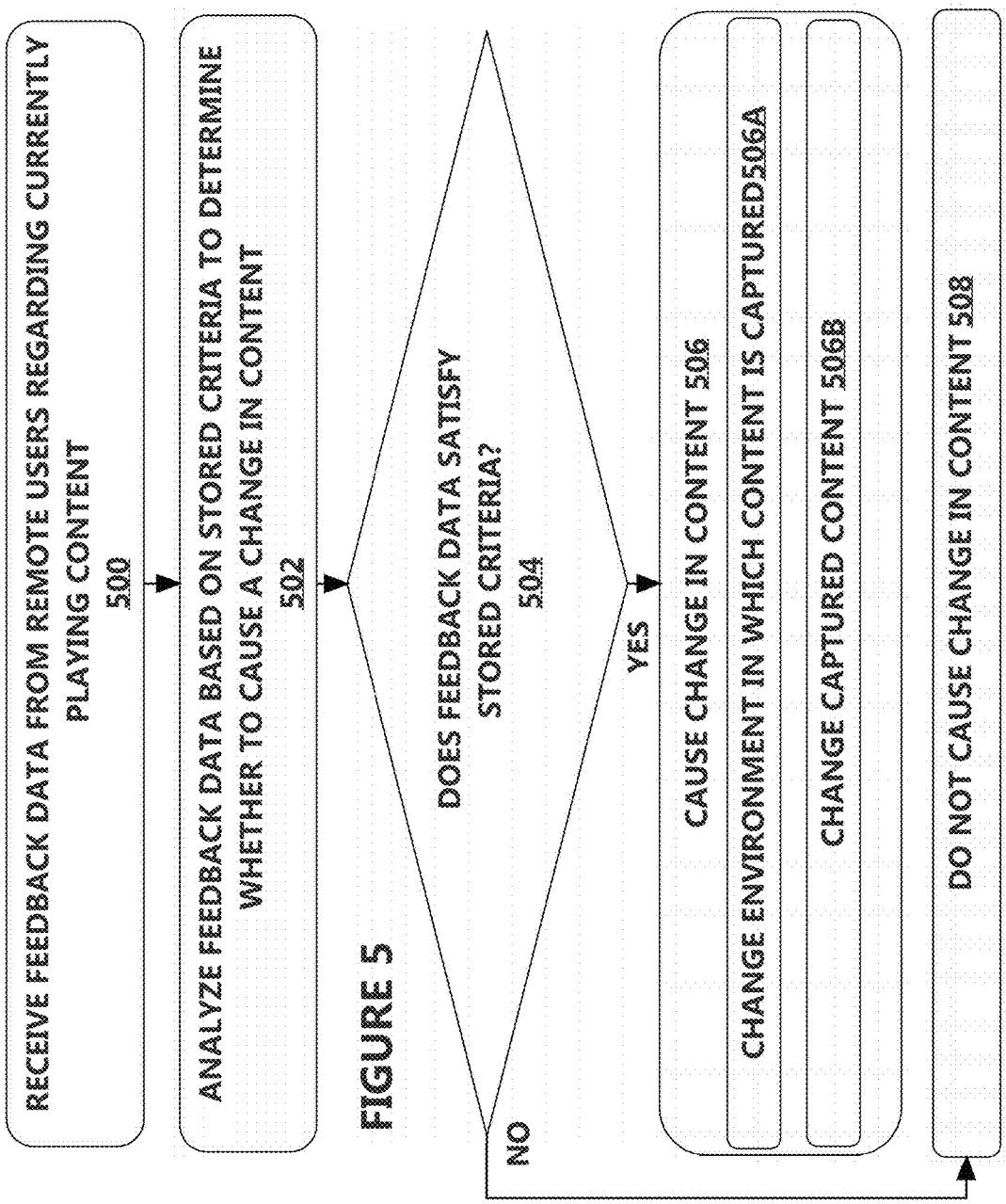
FIG. 5 illustrates an example process for managing feedback from an audience and changing content that is played to the audience.

FIG. 5 illustrates an example process for managing feedback from an audience and changing content that is played to the audience. In step 500, one or more computing devices receive feedback data from remote users regarding currently playing content. In step 502, the one or more computing devices analyze feedback data based on stored criteria to determine whether to cause a change in content. If the feedback data satisfies stored criteria, as determined in step 504, the one or more computing devices trigger a change in content in step 506. The change may include a change to an environment in which the content is captured in step 506A and/or a change in captured content in step 506B. If the feedback data does not satisfy the stored criteria, as determined in step 504, the one or more computing devices do not trigger a change in content, as noted in step 508.

Presenting Content

A content server is special-purpose hardware, software, or a combination thereof that generates and/or distributes content for presentation on various client machines. The content may include an audio track, a video track, or both. For example, live television content or streaming digital audio-visual content may include both an audio track and a video track. The content server sends the content towards the client machines for consumption by audience members that use the client machines. The content may be transmitted on a private or public television or radio network, such as HBO™, NBC™, or NPR™, or over a private or public computer network, such as a local area network, a virtual private network, or the Internet. Audience members may consume the content by viewing or listening to the content on various client machines. The client machines may or may not be remote from each other (i.e., in different buildings, corporate offices, communities, cities, states, or even countries).

A client-side or server-side content manager makes changes to the content by making post-capture changes, pre-capture changes, or both. Examples of post-capture changes include changing the audio track or the video track. Examples of pre-capture changes include changing the real-world sound that is being captured to generate the audio track, changing the real-world visual objects that are being captured to generate the video track.

In the context of post-capture changes, the content manager may insert or mix an audio object with other audio content on the audio track and/or insert or mix a video object with other video content on the video track. In one example, the content manager adds sound effects, audio clips representing cheers, audio clips representing jeers, or audio clips representing helpful tips to the audio track. In another example, the content manager adds video effects, adjusts lighting, inserts captions, reveals objects, or highlights objects on the video track. In yet another example, the content manager slows down content to emphasize a portion of the content, or speeds up content to de-emphasize a portion of the content and/or to catch up to the latest available content.

In one example of pre-capture changes, participant(s), who are separate from the audience, change their behavior and/or appearance based on the feedback, thereby changing the content that is captured. The participants may be participating in a physical or virtual event, such as a gameshow, a video game, an improvisational performance, a scripted performance, or another competitive or non-competitive event.

In a specific example, the content shows a real-time strategy video game, such as Starcraft II™, that is taking place between two or more competitors or otherwise involving two or more participants who are separate from the audience. In such a context, pre-capture modifications may include, for example, changes that effect the environment or controls of the game. For example, in response to an audience booing because one player is fleeing the battlefield, the speed of that player's vehicle may be reduced, thereby allowing other players to catch up to the fleeing player.

Collecting Feedback

The client machine includes a content player that plays the content to a viewer or listener. The client machine includes a feedback interface. The feedback interface may be a soft integrated interface that is incorporated with or overlaid on the playing content. The feedback interface may alternatively be a hard interface that involves physical buttons. Soft or hard feedback interfaces do not need to be integrated with the playing content. The feedback interface may be provided by one client machine, and the content may be playing on a different client machine. For example, a tablet may include a soft interface for providing feedback content that is associated with a television show, and the television show may be playing on a separate television.

Soft feedback interfaces may be customized to or integrated with the playing content. Alternatively, the soft feedback interfaces may be generic with respect to content, and the feedback items may be individually tagged, marked, or directed to the content. For example, Twitter™, Facebook™, or Google Plus™ users may provide feedback items in the form of posts that tag a particular segment of content or a particular collection of segments. In a specific example, a Twitter™ user, Joe, posts: "great performance by @performerA on #AGT." A feedback manager may retrieve the post from Twitter and, based on the tag that identifies a show, #AGT, and the information that identifies a participant, @performerA, may count the post as a positive vote for performer A on America's Got Talent. The feedback manager may also look at the time of the post to determine whether the post was added during a segment of the show or even during a particular part of the segment. The feedback manager may also collect other feedback such as public posts, semi-private posts, or private posts to a user account accessible to the feedback manager, likes, +1's, or thumbs up, dislikes, −1's, or thumbs down, re-tweets, or shares from social networks, feedback from email messages or text messages to an account accessible to the feedback manager, or feedback from phone calls. The feedback manager may look for messages or posts that are directed to a particular user account, are tagged with certain hashtags or keywords, or otherwise include certain keywords or reference certain entities or objects, which are known to be associated with certain keywords.

Feedback Item Attributes

Feedback items may differ both in how they are obtained (e.g. the push of a physical button, the push of a "soft" button, the capture of a sound, etc.) and in the meaning they convey (e.g. pleasure, displeasure, shock, etc.) In addition, feedback items may differ based on who they are from (the location, gender, age, clan of the audience member), and the portion of the content for which they are provided. Such information about the context or content of a feedback item is referred to herein as feedback item attributes.

Feedback items received for a single segment may have many different kinds of attributes. For example, a feedback item may have one or more of the following attributes:
  sentiment (e.g. "positive" or "negative")
  target (e.g. "participant #3")
  desired action (e.g. "receive power boost")
  time
  duration
  intensity
  manner of indication (e.g. pushed a button, sent a tweet, etc.)
  provider gender
  provider age
  provider clan These are merely a few of the virtually unlimited types of attributes that a feedback item may possess. Each attribute may be associated with one or multiple possible values. For example, a sentiment attribute may have the value "1" or "−1," or "positive" or "negative," indicating whether the corresponding feedback is positive or negative. Similarly, the target attribute may have the value "1," "2," or "3," indicating whether the feedback corresponds to a first, second, or third participant in the content. The value may be explicitly indicated in the feedback itself, or the value may be gleaned from the feedback. For example, the feedback manager may analyze a feedback item to check for keywords or phrases associated with positive and/or negative sentiment, and the feedback manager may assign a value to the feedback item based on results of the analysis. The feedback value may be associated with a set of items even if some of those items better reflect the value than others. For example, very positive feedback may be grouped with positive feedback and assigned a value of "1," or very positive feedback may be separated from positive feedback and assigned a value of "2."

The effect that the feedback has on the content of the segment may be based on the values associated with any of the feedback item attributes. For example, in response to receiving 1000 feedback items, it may be determined that 90% of those feedback items have a "positive" sentiment. Therefore, it may be determined that cheering should be added to the soundtrack. In addition, it may be determined that 80% of the positive sentiment came from female audience members. Consequently, it may be determined that the cheering should use female voices. However, if the intensity of one negative sentiment feedback item is extremely high, a single loud "boo" may be added in conjunction with the cheering.

Audience members may provide similar or different types of feedback, such as feedback that reflects similar or different feedback attribute values, for part of a segment of content or for a participant or object featured in the part of the segment. In one example, a first audience member may like a performer, and a second audience member may dislike the performer. Accordingly, the first audience member may provide positive feedback about the performer, and the second audience member may provide negative feedback about the performer.

Positive feedback may be identified based on keywords, commands, or patterns associated with positive sentiment, and negative feedback may be identified based on keywords, commands, or patterns associated with negative sentiment. The feedback may or may not include an explicit indication, such as a flag or marker, as to whether the feedback is positive or negative. The feedback manager may estimate whether the feedback item is positive or negative based on associated keywords. For example, "yes," "yeah," "good," "awesome," and "yay" are associated with positive sentiment, and "no," "nah," "bad," "horrible," and "boo" are associated with negative sentiment.

In the example, the positive and negative feedback may be considered as different types of feedback even if both types of feedback are captured in the same way. For example, the positive and negative feedback may have both been provided in a customized chat interface that is overlaid on video content, or the positive and negative feedback may have both been provided as public posts on a social network. The positive and negative feedback may have also been provided using different modes. For example, the positive feedback may have been provided as a voice recording that, when interpreted using speech-to-text software or tone analysis software, says "awesome!" or has a positive or increasing tone. The negative feedback may have been provided using a different mode than a recorded voice, such as the text chat command, "//boo."

Rather than simply indicate emotion, feedback may indicate desire that a particular change in content occur. For example, a user may provide feedback that indicates a trap door should be opened, feedback that indicates a helpful tip should be displayed to participants, or feedback that indicates that the background color should be changed from red to blue as viewed by the entire audience. These different types of feedback may not always be characterized as having positive or negative sentiment, but these types are still considered different because they attempt to cause or are otherwise associated with different changes in content.

The same audience member may provide different types of feedback at different times or with respect to same or different participants or objects. For example, the audience member may express positive sentiment for a first performance of a participant and negative sentiment for a second performance of the same participant. As another example, the audience member may provide feedback that indicates a secret door should be opened at a first time but closed at a second time. In yet another example, the audience member may provide feedback that indicates positive sentiment for a first performer and negative sentiment for a second, different performer.

The feedback manager may receive multiple feedback items of multiple different types. The different feedback items may be grouped based on the type of feedback item. For example, items reflecting positive sentiment about a performer may be placed in one set, and items reflecting a negative sentiment about the performer may be placed in another set. In another example, items reflecting a request to play a random animal noise may be placed in one set, and items reflecting a request to report the current score may be placed in another set. Rather than or in addition to retaining all of the feedback items, statistics may be tracked about each of the different sets of items. In one example, a first set includes several feedback items, and a second set includes zero, one, or only a few feedback items.

In one embodiment, the feedback manager receives items of a same type and may or may not receive any items of any other types. The items of the same type may be placed into a single set, and statistics may be tracked for the single set even if there are no other sets to compare to the single set. Whether or not the feedback manager is capable of distinguishing between different types of feedback, the feedback manager may, due to audience participation, receive only the single set of items for a given portion of the content segment.

Different types of feedback may refer to different participants or objects featured in the content. The different participants or objects may be identified using keywords, text commands, hash tags, sounds, colors, or any other information provided in or with the feedback to identify the participant or object. For example, one audience member may identify a red team of competitors in a first feedback item, and another audience member may identify a blue team of competitors in a second feedback item. The different audience members could also refer to different objects in a physical or virtual environment. Helpful objects may include, but are not limited to, health packs, helpful tips, or warnings, and harmful objects may include, but are not limited to, trap doors, virtual bombs, or misleading tips. The helpful or harmful objects could be selectively provided to a particular team or competitor.

In one embodiment, the type of feedback is identified based on information about the audience member who provided the feedback. For example, one audience member may be associated with a first group, clan, or competitor, and a second audience member may be associated with a second group, clan, or competitor. In another example, different audience members may be from different physical or virtual locations or regions, and the different feedback types may be defined by the different locations or regions. In a specific example, feedback from audience members in California may be aggregated as one type of feedback, and feedback from audience members in Texas may be aggregated as another type of feedback.

The different types of feedback may also be defined based on a physical or virtual button that was pressed to generate the feedback. For example, an audience member may press a red button to generate a first type of feedback or a blue button to generate a second type of feedback.

The different types of feedback may also be defined based on which of several presented options were selected by an audience member. For example, audience members may be prompted to select whether or not a performer should be kicked off of a show. Options selecting to kick the performer off of the show are a first type of feedback, and options selecting to keep the performer on the show are a second type of feedback. The option may also be built into an interface such that the audience members may select the option using specialized commands or other input without being prompted for such input.

In one embodiment, the audience feedback is triggered by different motions as detected by movement sensors or cameras used by the audience members. One example movement sensor and camera system is the Microsoft™ Kinect™, which captures user movement in the form of a video and in the form of a moving virtual skeleton. The moving virtual skeleton is constructed by capturing and processing ambient light input and infrared input. In one example, one type of feedback is triggered by someone getting up and leaving the room, and another type of feedback is triggered by someone jumping up and down.

In one embodiment, the feedback is provided as picture, video, or audio content that is generated by the audience member. For example, the audience member may shout "yay" or "boo", or may do a first pumping pose. The content may be captured by a recorder, camera, camcorder, movement capture device, or other audio and/or video capture device at the audience member's location. For example, the audience member may speak into his/her microphone that is connected to his/her computer. In various examples, audio or video feedback may be transmitted via a voice or video conferencing connection between the audience member and a content manager, or over a network connection between the audience member and the content manager.

Analyzing Feedback

Feedback may be analyzed on an item-by-item basis or in the aggregate for different types of items or for feedback attributes having different values. A feedback manager receives feedback items and stores feedback data that represents the feedback items. The feedback data may include actual feedback items or may include a summary of feedback items that have been received. For example, the feedback data may list how many feedback items of different types were received during a given window of time. The feedback data may maintain counts of feedback items for several different windows of time and several different types of feedback items. In another example, the feedback data may include actual times, rather than windows of time, in which different feedback items were received. The actual times or the windows of time may be analyzed to determine increasing or decreasing rates of feedback, optionally specific to different types of feedback or to different values of feedback attributes.

In one embodiment, the feedback manager compares the feedback data to stored criteria to determine whether or not to cause a change in playing content. The stored criteria may be based on how many feedback items of different types or in different sets have been provided. For example, the feedback manager may analyze feedback data for a particular type of feedback to determine whether N items have been received for a given period of time. In another example, the feedback manager may analyze the feedback data for a particular option, which, for example, may comprise a tuple of (positive feedback, negative feedback) or a member-selected feedback value, to determine whether N positive items, N negative items, or N net positive items (after subtracting negative items) or net negative items have been received for that option during a given period of time. Options, as used herein, refer to feedback items that were selected from two or more alternate types of feedback, such as positive/negative, participant A/participant B, object A/object B, or action A/action B.

Upon determining that a threshold number of items of a given type, for a given option, or for a given attribute-value pair, have been received, the feedback manager may cause an action or change associated with the type of feedback item, option, or attribute-value pair. The feedback manager may also reset the counter for the type of feedback item, option, or attribute-value pair that triggered the action or change. The feedback manager may avoid or even prevent an action or change associated with a type of feedback item or option that does not satisfy the threshold.

In one embodiment, rules for assigning weights to different types or attribute values of feedback items may be included in the stored criteria. For example, feedback items may be weighed based on how recently the feedback items were provided. More recent feedback items may get higher weights than less recent feedback items. The weights may be part of the stored criteria that contributes to the determination of whether or not to cause an action or change associated with a type of feedback item, option, or attribute value.

In another example, feedback items are weighed based on social media characteristics of the feedback providers, such as how many friends, followers, and/or friends of friends are connected to a feedback provider in a social network. Feedback items may be weighed based on characteristics of the feedback item itself, such as how many likes, +1's, or thumbs up, dislikes, −1's, or thumbs down, re-tweets, or shares were provided for the feedback item. Feedback items that are popular or receive more support may be more likely to trigger an action associated with the type of feedback item or option.

In yet another example, feedback items are weighed based on other characteristics of the feedback providers or the feedback items, such as a provider's position in a virtual audience or a number of points that were used to make the feedback item more prominent. Users may spend points on a feedback interface to boost a feedback item and make the item more prominent or more likely to trigger an action associated with the type of feedback item or option. Audience members may also purchase or reserve different virtual seats, virtual sections, or other virtual positions. Better virtual positions may make feedback items from those audience members more heavily weighted or more prominent. The prominence of a feedback item may be part of the stored criteria that contributes to the determination of whether or not to cause an action associated with a type of feedback item or option. In one example, audience members with the best virtual seats may even be audible or visible to participants that are featured in the playing content, even though audience members in other seats may be selectively filtered or completely blocked from the participants and/or from the rest of the audience.

In one embodiment, an audience member's position in a virtual audience may increase or decrease the prominence of feedback for an audience in a same virtual section as the audience member. For example, audience members in a same section may hear or see each other's feedback more often than audience members hear or see feedback provided by the audience outside of that section. In another example, audience members may hear or see all feedback from other audience members in the same section. A group of audience members may witness an event while being able to readily communicate with others in the group, even though they may not witness all of the feedback from audience members outside of the group. Feedback from audience members outside of the group may be filtered according to the stored criteria. Content changes based on feedback may be localized to different groups or sections of an audience such that the different sections make up a sub-audience that consumes the changed content.

In one embodiment, feedback from friends of an audience member may have a greater prominence or weight than feedback from audience members who are not friends of the audience member. For example, feedback from friends may be presented more frequently or more loudly than feedback from non-friends (i.e., strangers). In a particular example, friends may be cheering while others are booing, and the audience member may hear the cheers louder than the boos.

In another example, audience members rooting for one team may hear feedback from other members rooting for that same team more prominently than feedback from other members rooting for other teams. For example, audience members rooting for the blue team may hear each other more frequently than they hear audience members rooting for the red team.

In various examples, the stored criteria may involve a complex formula of weights and/or counts of feedback items over a given time period. The feedback items may be compared relatively, as a percentage of total counts of feedback items, to minimum or maximum absolute thresholds, or using a combination of relative and/or absolute measures. For example, the stored criteria may be satisfied if, in the last 20 seconds, 90% or more of feedback received is positive, and feedback is received from at least 30% of the audience. In another example, the stored criteria may be satisfied if, in the last minute, more than 300 audience members indicated positive feedback. If the stored criteria is satisfied in either of these examples, the feedback manager may trigger the addition of cheer content to main content that is playing to the audience. The feedback manager may also check if the intensity of any particular audience member's feedback exceeds a threshold, and, if so, the feedback content added to the main content may be based on a recording of the particular audience member. For example, the added content may be a recording of the particular audience member cheering.

Making Changes

Feedback items are associated with content changes or actions that cause content changes. Different types, options, or attribute values of feedback items may be associated with different types of changes or candidate actions that cause such changes. Conversely, same types, options, or attribute values of feedback items may be associated with same types of changes or candidate actions that cause such changes. A particular change may be caused when the feedback manager determines, based on feedback data, that an associated type of feedback should triggers the particular change.

In one example, a type, option, or value of feedback associated with lighting, camera, or sound adjustments or effects may, if such feedback results in the feedback manager determining that feedback data satisfies stored criteria, result in such adjustments or effects. For example, the feedback manager may, upon determining that the stored criteria is satisfied by the feedback data, instruct a content manager to change a song that a performer is singing to, or cause a slow motion effect followed by a fast forward catchup effect during a game.

In another example, a type, option, or value of feedback may be associated with a physical action, such as operating a dunk booth or trap door, lighting an "X" sign above a performer, activating a speaker to play a sound provided by an audience member or a default sound, or causing display of a message to a producer, actor, or participant that is involved in generating the content. Any such actions may be caused as a result of such feedback satisfying the stored criteria. Physical actions may, in turn, cause changes to playing content. For example, causing a physical change in a physical environment may cause a change to content that is captured from the physical environment. In a specific example, causing a gameshow contestant to fall through a trap door may be visible to viewers of the gameshow.

In yet another example, a type, option, or value of feedback is associated with a virtual action, such as providing reinforcement units to a particular team featured in the content, strengthening units of the particular team, or weakening the units of the particular team. The feedback may also be associated with a change in gameplay or a change that affects gameplay for participant(s), game rules, rewards to participant(s), or progress of game participant(s). Any such actions may be caused as a result of such feedback satisfying the stored criteria. Virtual actions may, in turn, cause changes to playing content. For example, causing a virtual change in a virtual environment may cause a change to content that is captured from the virtual environment. In a specific example, providing reinforcements to a team in a video game may be visible to viewers of the video game.

Feedback types, options, or values may also be associated with actions that affect participants featured in the content and/or a physical or virtual environment featured in the content. Alternatively, the feedback types, options, or values may be associated with changes that affect only that content that is consumed by audience members and not any participants featured in the content and not any environment in which the participants exist. For example, the feedback may trigger a lighting adjustment that is seen in the content that is played to the audience members but that does not affect lighting in a physical environment from which such content is captured. These types of changes may be made while processing the content after the content has been captured.

In one embodiment, audience member(s) witness main content and provide feedback on the main content. The feedback manager may determine, based on stored criteria, to change the main content to incorporate content from the feedback. As a result, the content manager adds member-generated feedback content to the main content. In another example, the content manager may add, to the main content, default content that is stored in association with a particular type, option, or value of feedback that was provided by an audience member. In yet another example, the content manager may add, to the main content, an item of default content that is selected from among a plurality of items of default content that are stored in association with a particular feedback attribute, such as the particular type, option, or value of feedback, that is associated with the feedback provided by the audience member.

The feedback manager may trigger a change that is associated with a first type, option, or value of feedback but not with a second type, option, or value of feedback. Such a trigger may occur as a result of the feedback manager determining that the stored criteria is satisfied for the first type, option or value of feedback but not for the second type, option, or value of feedback. For example, audience members may have provided more feedback items of the first type, option, or value of feedback than of the second type, option, or value of feedback. Candidate change(s) associated with type(s), option(s), or value(s) of feedback for which the stored criteria is not satisfied may be avoided or even prevented.

The feedback manager receives different items of feedback, which may or may not be of different types, options, or values and may or may not be from different audience members. The feedback manager triggers a change in content for a first item of feedback but not for a second item of the different items of feedback. In one example, the first item is associated with a first time, and the second item is associated with a second time. The second time is not in proximity to the first time, and the change in content occurs in proximity to the first time but not in proximity to the second time. In other words, changes are caused near or shortly after items that trigger the changes, and these changes might not occur near other items that did not trigger the changes.

In one embodiment, audience members select virtual seats to witness an event. The virtual seats may be in different sections and may be nearer to or further from a stage or performance region. Based on feedback received during the event, the content manager may cause changes specific to different sections and/or based on how far the audience member is from the stage or performance region. For example, audience members in a same clan may be in a same virtual group, and these audience members may witness all or most of the feedback from other audience members in the same group. These audience members may witness some, none, or only a filtered portion of feedback from audience members outside of the group. In another example, audience members with the best seats may be audible to more audience members or even to participants featured in the content. For example, a performer may hear audio feedback in the form of a "yay" or "boo" from an audience member with a virtual seat in a prime location, but may not hear any feedback from an audience member with a worse virtual seat.

In another example, audience members may have a joystick, and their collective input on the joystick may move an object in an animated video. The object may move according to rules that are satisfied based on thresholds such that unpopular feedback does not affect the movement of the object. Alternatively, the object may move in an analog manner such that all feedback affects the movement of the object.

In yet another example, a character in a live television show may reach decision points at which audience members are prompted for feedback. The audience's collective response may be used to select from among a number of discrete options. The character may then make his decision, thereby causing the story to branch one way or another, based on a selected discrete option as chosen by the audience.

Example Server-Side System

FIG. 1 illustrates an example server-side system for managing feedback from an audience and changing content that is played to the audience. As shown, audience members 150A and 150B receive a segment of content C from content manager 110 via Internet 140. The segment may have been captured by capture device 122 in environment 120. For example, the captured segment may feature participant(s) 126 in environment 120. Audience members 150A and 150B may then provide input to respective clients 130A and 130B, and such input triggers feedback data F1 and F2 to be sent, via Internet 140, to feedback processor 102 of feedback manager 100.

Feedback manager 100 processes the feedback and retains information about the feedback in stored feedback data 104.

Feedback analyzer 106 accesses stored feedback data 104 according to stored criteria 108 in order to determine whether or not to send change request(s) to content manager 110. In response to determining that at least a subset of the feedback data 104 satisfies stored criteria 108, feedback manager 100 sends a change request to content manager 110.

Content manager 110 may cause changes to content segments before, during, or after the content segments are captured from environment 120. To cause changes before or during the capture of content segments, a controller 112 of content manager 110 sends a control message to agent 124 for environment 120. Agent 124 may cause changes to capture device 122 or to participant(s) 126 or other object(s) in environment 120. Capture device 122 then captures changed content segment C', which is forwarded to content manager 110 and may be then forwarded to clients 130A and 130B via Internet 140.

Content manager 110 may alternatively or additionally cause changes to content segments after the content segments are captured from environment 120 or otherwise generated. Content manager 110 receives content segment C or even changed content segment C', and a content processor 114 of content manager 110 processes the content segment to generate changed content segment C". Note that changed content segment C" may have been changed by content processor 114 alone, or may have been changed by both content processor 114 and agent 124. The changed content segment C" is sent to clients 130A and 130B via Internet 140. The change content segment C' or C" may be witnessed by audience members 150A and 150B.

Example Client-Side System

Figure 4:
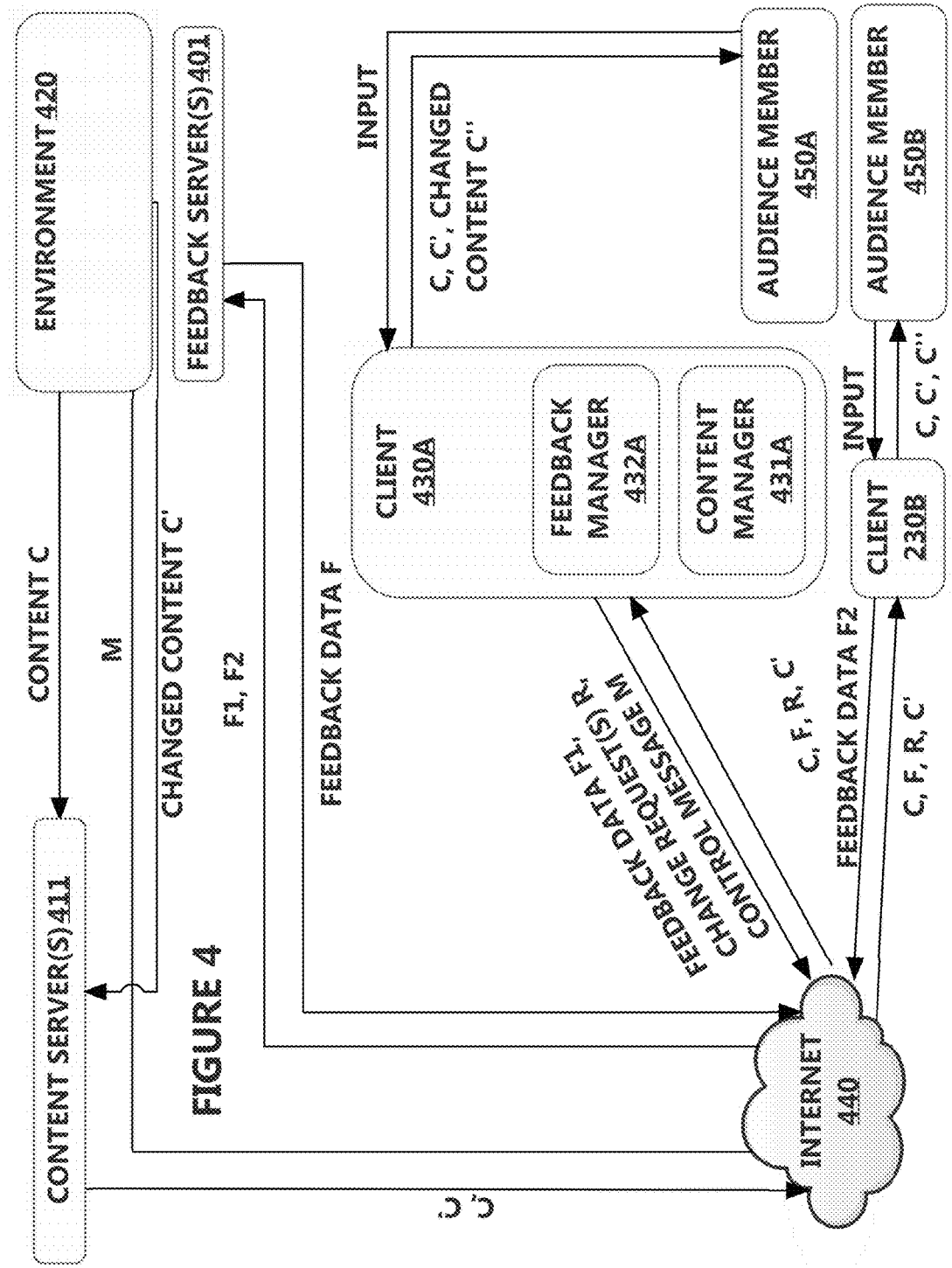
FIG. 4 illustrates example client-side systems for managing feedback from an audience and changing content that is played to the audience.

FIG. 4 illustrates example client-side systems for managing feedback from an audience and changing content that is played to the audience. As shown, audience members 450A and 450B receive a segment of content C from content server 411 via Internet 440. Audience members 450A and 450B may then provide input to respective clients 430A and 430B, and such input triggers feedback data F1 and F2 to be sent, at least partially via Internet 440, to feedback managers 432A and/or 432B (not shown in the figure). In response to determining that at least a subset of the feedback data satisfies stored criteria, feedback manager 432A and/or 432B sends a change request, at least partially via Internet 440, to content manager 431A and/or content manager 431B (not shown in the figure) on clients 430A and 430B.

Content manager 431A and/or 431B (not shown in the figure) may cause changes to content segments before, during, or after the content segments are captured from environment 420. To cause changes before or during the capture of content segments, content manager 431A sends a control message, via Internet 440, to an agent for environment 420. The changed content is captured as C'.

To cause changes after content segments are captured from environment 420, content manager 431A and/or 431B (not shown in the figure) receives content segment C or even changed content segment C', and content manager 431A and/or 431B (not shown in the figure) processes the content segment to generate changed content segment C". The change content segment C' or C" may be witnessed by audience members 450A and 450B.

Example Mixed Server-Side and Client-Side System

Figure 2:
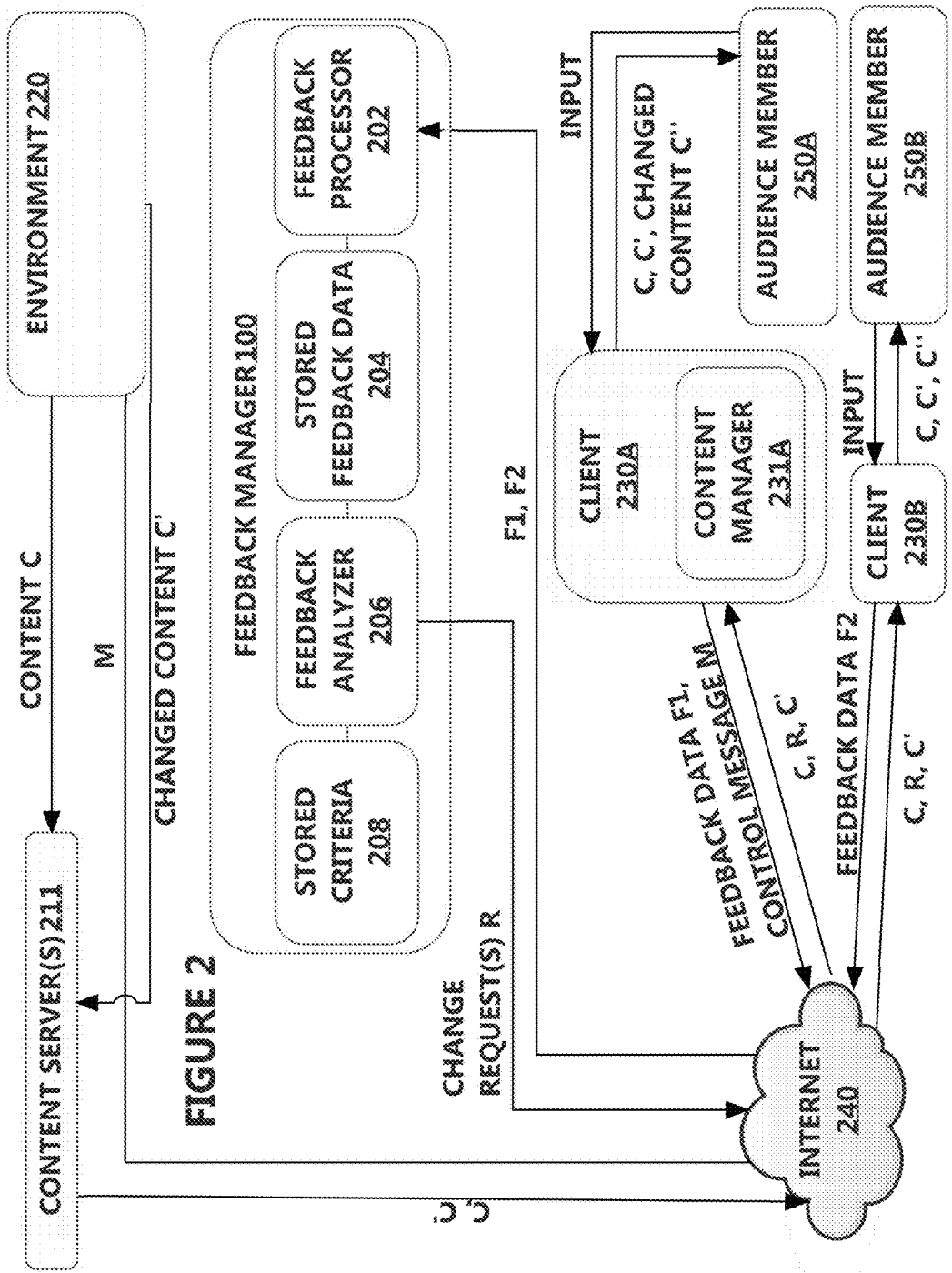
FIG. 2 illustrates an example server-side system for managing feedback from an audience and example client-side systems for changing content that is played to the audience.
Figure 3:
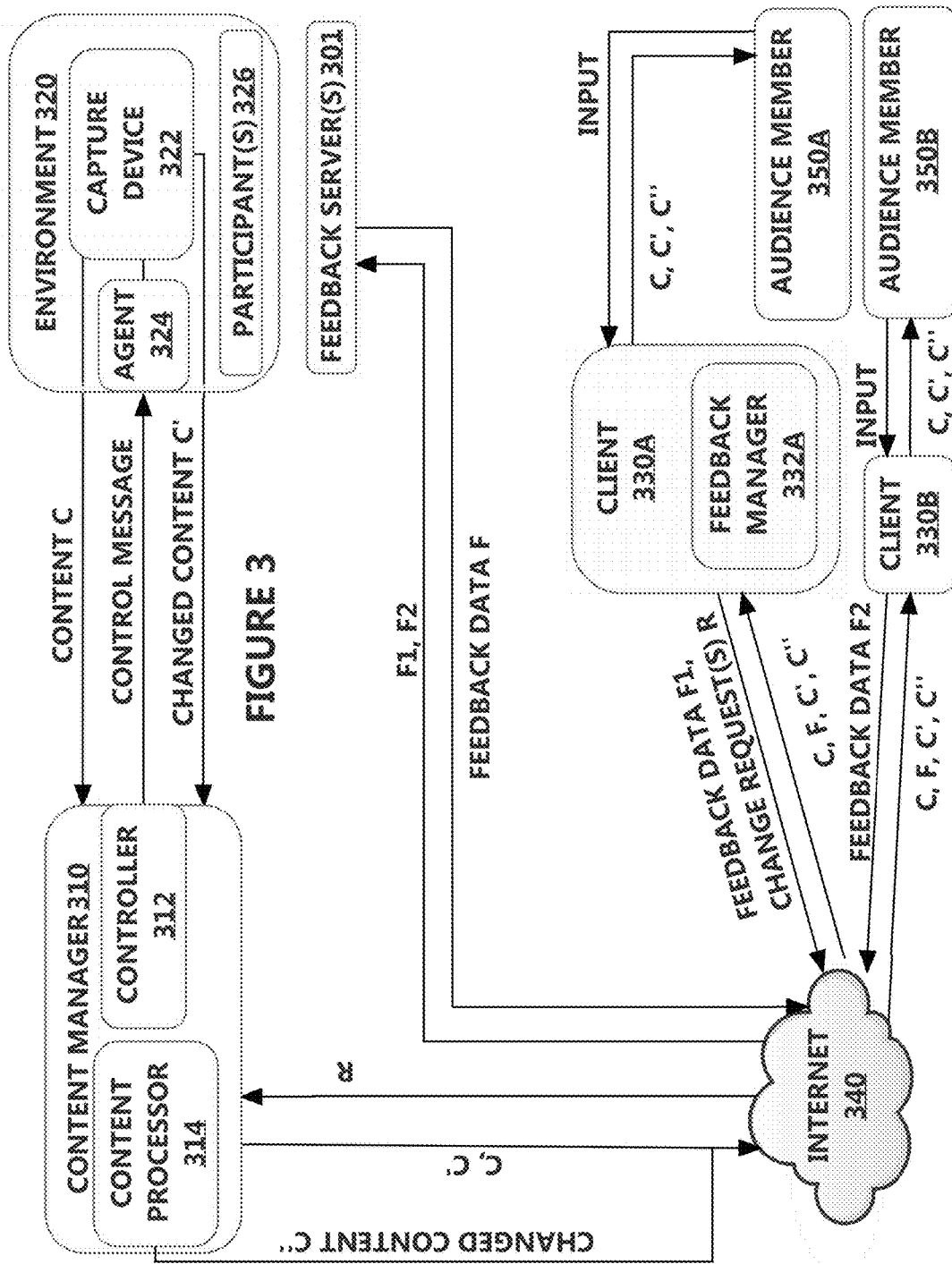
FIG. 3 illustrates example client-side systems for managing feedback from an audience and a server-side system for changing content that is played to the audience.

FIGS. 2 and 3 illustrate example mixed server-side and client-side systems.

FIG. 2 illustrates an example server-side system for managing feedback from an audience and example client-side systems for changing content that is played to the audience. As shown, audience members 250A and 250B may provide input to respective clients 230A and 230B, and such input triggers feedback data F1 and F2 to be sent, via Internet 240, to feedback manager 200. In response to determining that at least a subset of the feedback data 204 satisfies stored criteria 208, feedback manager 200 sends a change request to content manager 231A and/or content manager 231B (not shown in the figure) on clients 230A and 230B.

To cause changes before or during the capture of content segments, content manager 231A sends a control message, via Internet 240, to an agent for environment 220. The changed content is captured as C'. To cause changes after content segments are captured from environment 220, content manager 231A and/or 231B (not shown in the figure) receives content segment C or even changed content segment C', and content manager 231A and/or 231B (not shown in the figure) processes the content segment to generate changed content segment C". The change content segment C' or C" may be witnessed by audience members 250A and 250B.

FIG. 3 illustrates example client-side systems for managing feedback from an audience and a server-side system for changing content that is played to the audience. As shown, audience members 350A and 350B may provide input to respective clients 330A and 330B, and such input triggers feedback data F1 and F2 to be sent, at least partially via Internet 340, to feedback managers 332A and/or 332B (not shown in the figure). In response to determining that at least a subset of the feedback data satisfies stored criteria, feedback manager 332A and/or 332B sends a change request, via Internet 340, to content manager 310.

To cause changes before or during the capture of content segments, content manager 310 sends a control message to an agent for environment 320. The changed content is captured as C', which is forwarded to content manager 310 and may be then forwarded to clients 330A and 330B via Internet 340. To cause changes after capture of content segments, content manager 310 receives content segment C or even changed content segment C', and content manager 310 processes the content segment to generate changed content segment C". The changed content segment C" is sent to clients 330A and 330B via Internet 340. The change content segment C' or C" may be witnessed by audience members 350A and 350B.

Video Game Example

Figure 6:
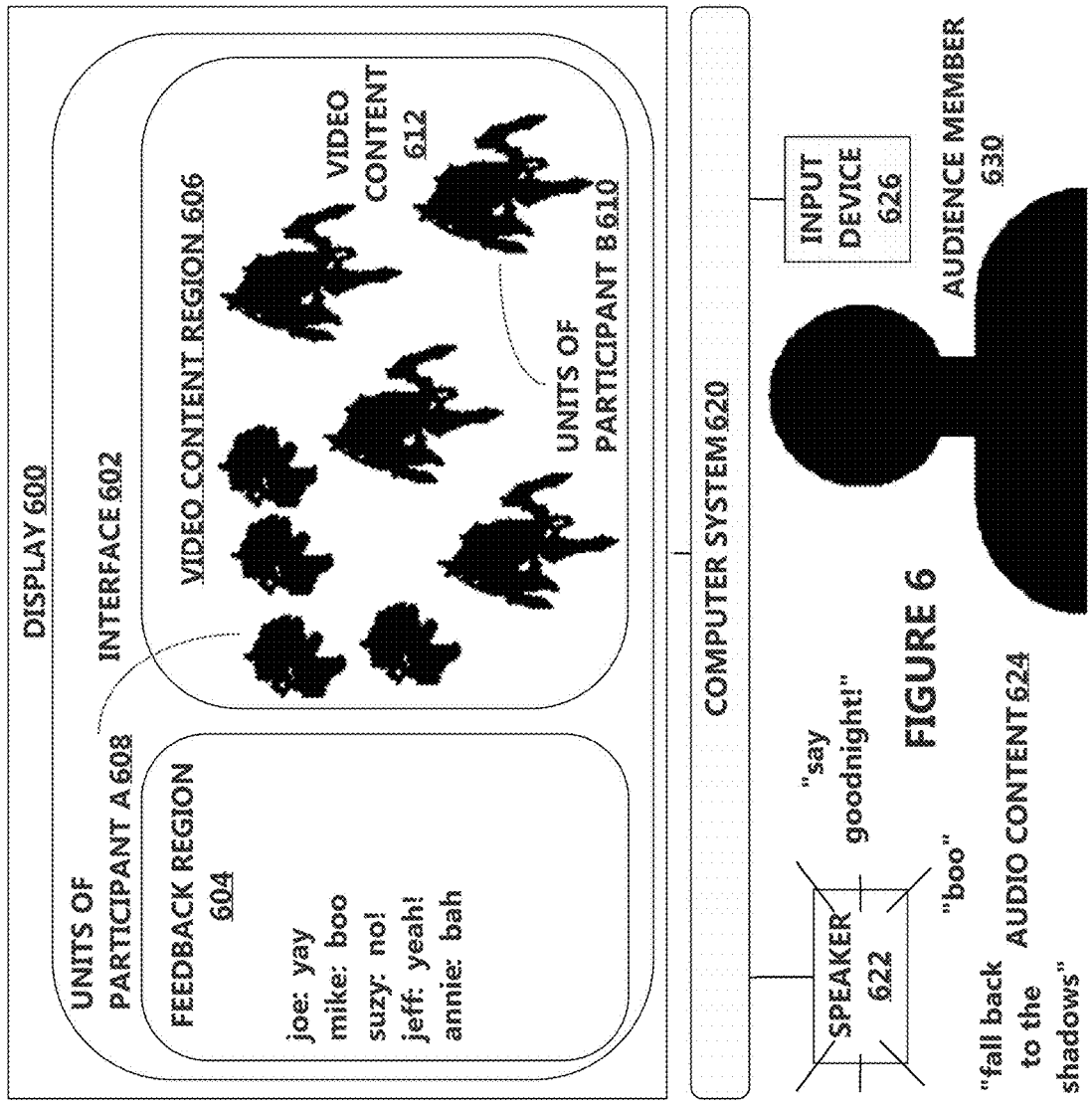

FIG. 6 illustrates an example interface for viewing video game content, providing feedback, and viewing changed video game content. As shown, two participants are competing in a video game, Starcraft II™, that is displayed, via display 600, in video content region 606. Video content region 606 is viewed by audience member 630, who is not one of the participants. In the example, video content 612 shows units of participant A 608 (Marauders, as shown) and units of participant B 610 (Stalkers, as shown). Audience member 630 provides feedback via input device 626 to computer system 620, which is connected to display 600. The feedback appears in a feedback region 604 on an interface 602 of display 600.

As shown, three audience members (mike, suzy, and annie) provided negative feedback ("boo," "no!," and "bah"), and two audience members (joe and jeff) provided positive feedback ("yay" and "yeah!"). A feedback manager may determine that the negative feedback satisfies a minimum threshold of three items, and the positive feedback does not satisfy the minimum threshold of three items. As a result, the feedback manager may cause the negative feedback to be incorporated into the content but not the positive feedback. As shown, the negative feedback is incorporated into audio content 624, as played from speaker 622 in the form of a "boo." In the example, the audio content is played after sounds that were generated by units of participant B ("fall back to the shadows") and before sounds that were generated by units of participant A ("say goodnight!"). The played content may be audible to audience member 630, who could be joe, mike, suzy, jeff, annie, or some other audience member.

Tv Show Example

FIG. 7 illustrates an example interface for viewing live television content, providing feedback, and viewing changed television content. As shown, content 712 is presented on display 702 and played from speaker 722 of television 700. Audience member 730 may consume content while using a tablet 720, which is separate from television 700. The tablet 720 may be connected to the Internet, and may include a social feedback interface 728, such as a Twitter™, Facebook™, or Google Plus™ interface. In the example, the interface shows two posts, one from an audience member named mike and another from an audience member named joe. The post from mike provides negative feedback regarding participant B, and the post from joe provides negative feedback regarding participant A. As shown, mike's post has been liked or +1'd or shared 1999 times, and joe's post has been liked only 1600 times.

A feedback manager may receive the feedback items and the updated information about the feedback items, such as how many times the items have been liked. In the example, the feedback manager may be waiting to trigger a change in content 712 until a negative post has been liked 2000 times. If audience member 730 likes mike's post, the feedback manager may then request that trap door 716 be opened, thereby dropping participant 714B from the television show.

On-the-Fly Effects

Using the techniques described herein, feedback from remote audience members may cause changes that are visible and/or audible to all remote audience members as those audience members are consuming the content. Thus, remote audience members effectively become participants themselves, in that they collectively control certain aspects of what they are viewing. However, the audience members may be different from the actual participants in that their individual feedback is not guaranteed to cause any changes in the content. Further, audience members do not have to wait for the next episode in order to see the effect of their feedback. In embodiments that employ currently available high-speed transmission mechanisms, the changes caused by the feedback may be experienced in near-real-time.

Hardware Overview

Audio and video content may be captured and edited using any combination of audio editing and/or video editing hardware and/or software. For example, hardware filters and/or zoom adjustments may be applied before, during, or after the capture of audio or video content on a recorder, camera, or camcorder. As another example, captured video content may be processed by one or more audio and/or video editing software tools in sequence or in parallel. In yet another example, a software capture tool operates on top of an engine that manages a virtual environment. For example, the software capture tool may capture participants who are competing in the virtual environment as part of a video game.

In one embodiment, changes to content may be made by a combination of manual and automated steps. For example, a human director or human actor may, based on an automatic recommendation from a feedback manager, make adjustments to an environment that is being captured, and software and/or hardware tools may then capture the adjusted content. In another example, a human participant in a video game may, based on automatic hints from a feedback manager, make adjustments to his/her gameplay, which is then captured by a software tool that operates on top of a game engine that manages the gameplay.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
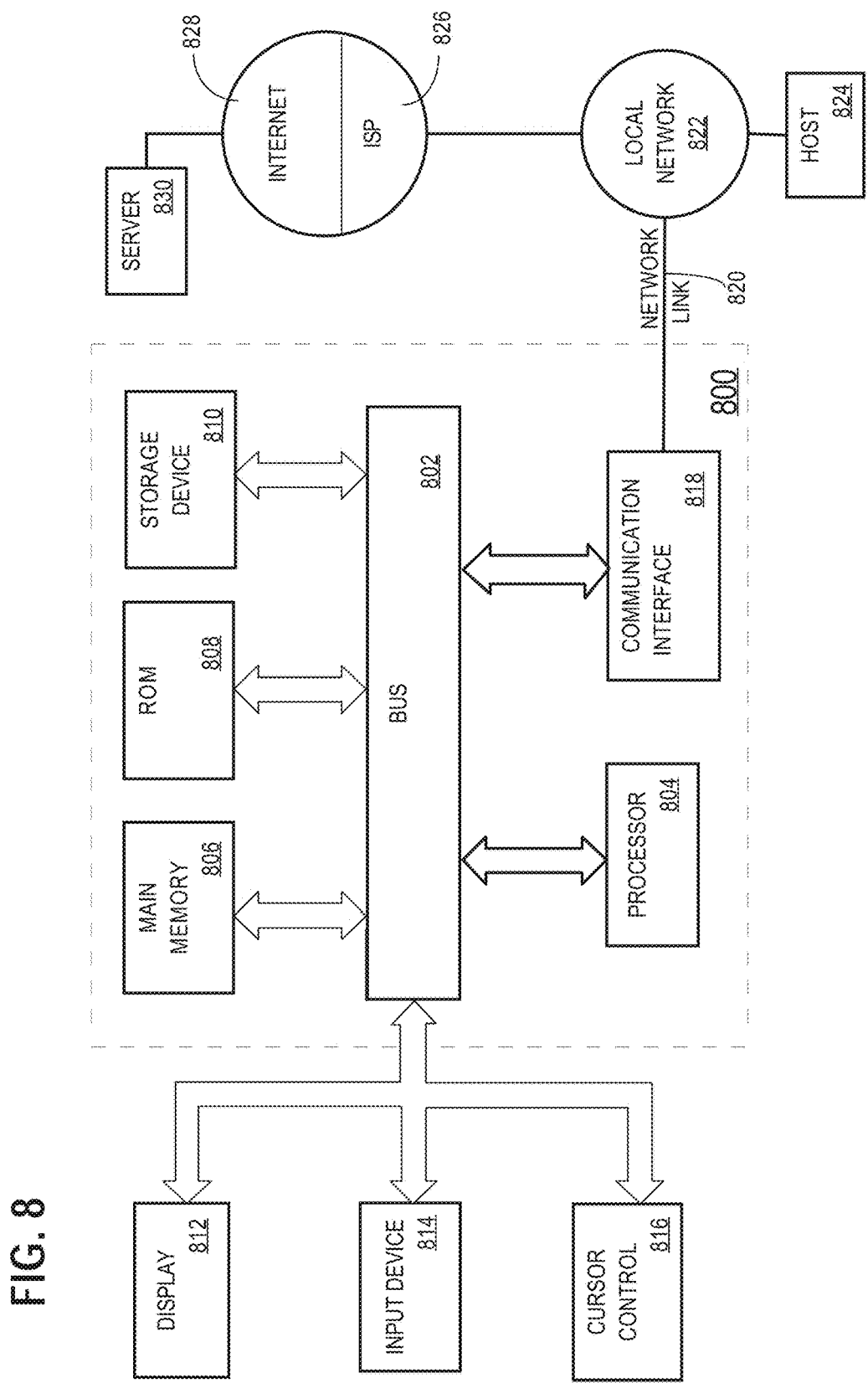
FIG. 8 illustrates an example computer system for performing various machine-implemented steps described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
concurrently generating a set of audience feeds viewed by live audience members viewing but not participating in a video game;
wherein each audience feed in the set of audience feeds includes video game content;
while generating and displaying the plurality of feeds:
receiving feedback items from members of the live audience;
wherein the feedback items include:
a first feedback item, from a first member of the live audience, that includes first feedback content in a particular format; and
a second feedback item, from a second member of the live audience, that includes second feedback content in the particular format;
wherein the first content is different than the second content;
wherein the particular format is one of: textual feedback, audio feedback, or video feedback;
automatically performing a content analysis of each of the feedback items and, based on the content analysis, classifying each of the feedback items into feedback types, wherein each feedback type is associated with:
a corresponding post-capture change that affects contents of one or more audience feeds; and
stored triggering criteria for triggering the corresponding post-capture change;
wherein classifying each of the feedback items into feedback types includes:
classifying, as a first feedback type, the first feedback item based on the first content; and
classifying, as the first feedback type, the second feedback item based on the second content;
based at least in part on the number of feedback items classified as the first feedback type, determining whether the feedback items from the members of the live audience satisfy the stored triggering criteria that is associated with the first feedback type; and
responsive to determining that the feedback items from the members of the live audience satisfy the stored triggering criteria that is associated with the first feedback type, causing the post-capture change that corresponds to the first feedback type to be made to one or more audience feeds;
wherein the method is performed by one or more processors.

2. The method of claim 1 wherein the feedback items include a third feedback item, from a third member of the live audience, that includes third feedback content in the particular format;
wherein classifying each of the feedback items includes classifying, as a second feedback type, the third feedback item based on the third content;
wherein the second feedback type is associated with a different post-capture change than the post-capture change associated with the first feedback type.

3. The method of claim 1, wherein the stored triggering criteria that is associated with the first feedback type accounts for how many items are assigned to the first feedback type.

4. The method of claim 2, further comprising determining, not to perform the different post-capture change associated with the second feedback type.

5. The method of claim 1, wherein the stored triggering criteria accounts for how many feedback items were received.

6. The method of claim 1, wherein classifying each of the feedback items into feedback types includes classifying other feedback items into other feedback types, wherein the post-capture change associated with the first feedback type is not associated with the other feedback types, wherein other candidate post-capture changes that affect the content of the one more audience feeds are associated with the other feedback types, further comprising determining not to cause at least one of the other candidate post-capture changes.

7. The method of claim 1, wherein the video game content comprises an audio track, and wherein the post-capture change affects the audio track.

8. The method of claim 1, wherein the video game content comprises a video track, and wherein the post-capture change affects the video track.

9. The method of claim 1, wherein the video game content is main content, and wherein the post-capture change adds first content generated by the first member to the main content.

10. The method of claim 1, wherein the video game content is main content, and wherein the post-capture change adds, to the main content, default content stored in association with the first feedback type.

11. The method of claim 1, wherein the contents of the one or more audience feeds are delivered via live television.

12. The method of claim 1, wherein the contents of the one or more audience feeds are delivered via a computer network.

13. The method of claim 1, wherein the stored triggering criteria associated with the first feedback type accounts for a first prominence factor of the first feedback item, wherein the second feedback item has a second prominence factor that is different from the first prominence factor.

14. The method of claim 1, wherein the first feedback item is associated with a first time and the second feedback item is associated with a second time, wherein the second time is not in proximity to the first time, wherein the post-capture change occurs according to the first feedback item but not according to the second feedback item, and wherein the post-capture change occurs in proximity to the first time but not in proximity to the second time.

15. The method of claim 2 wherein the second feedback type is associated with different stored triggering criteria than the stored triggering criteria associated with the first feedback type, the method further comprising:
based at least in part on the number of feedback items classified as the second feedback type, determining whether the feedback items from the members of the live audience satisfy the stored triggering criteria that is associated with the second feedback type;
responsive to determining that the feedback items from the members of the live audience satisfy the stored triggering criteria that is associated with the second feedback type, causing a second post-capture change that is associated with the second feedback type.

16. One or more non-transitory computer-readable storage media storing instructions which, when executed, cause:
concurrently generating a set of audience feeds viewed by live audience members viewing but not participating in a video game;
wherein each audience feed in the set of audience feeds includes video game content;
while generating and displaying the plurality of feeds:
receiving feedback items from members of the live audience;
wherein the feedback items include:
a first feedback item, from a first member of the live audience, that includes first feedback content in a particular format; and
a second feedback item, from a second member of the live audience, that includes second feedback content in the particular format;
wherein the first content is different than the second content;
wherein the particular format is one of: textual feedback, audio feedback, or video feedback;
automatically performing a content analysis of each of the feedback items and, based on the content analysis, classifying each of the feedback items into feedback types, wherein each feedback type is associated with:
a corresponding post-capture change that affects contents of one or more audience feeds; and
stored triggering criteria for triggering the corresponding post-capture change;
wherein classifying each of the feedback items into feedback types includes:

classifying, as a first feedback type, the first feedback item based on the first content; and
classifying, as the first feedback type, the second feedback item based on the second content;
based at least in part on the number of feedback items classified as the first feedback type, determining whether the feedback items from the members of the live audience satisfy the stored triggering criteria that is associated with the first feedback type; and
responsive to determining that the feedback items from the members of the live audience satisfy the stored triggering criteria that is associated with the first feedback type, causing the post capture change that corresponds to the first feedback type to be made to one or more audience feeds.

17. A method comprising:
concurrently generating a set of audience feeds viewed by live audience members viewing but not participating in a video game;
wherein each audience feed in the set of audience feeds includes video game content;
while playing the set of audience feeds:
receiving, from members of the live audience, by one or more computing devices, feedback data that represents items of feedback on one or more played portions of the video game content, wherein the items of feedback comprise:
a first audio clip of feedback recorded from a first member of the audience, and
a second audio clip of feedback recorded from a second member of the audience,
wherein the first member and the second member are at locations that are remote relative to each other;
wherein the set of audience feeds include an audio track;
based at least in part on stored triggering criteria for triggering a corresponding post-capture change and the feedback data, determining, by the one or more computing devices, whether to cause the corresponding post-capture change in one or more audience feeds;
based at least in part on determining to cause the post-capture change in the one or more audience feeds, causing the post-capture change in the one or more audience feeds by at least adding audio content from the first audio clip to the audio track;
wherein the method is performed by one or more processors.

18. The method of claim 17, further comprising:
dividing the items of feedback represented in the feedback data into two or more categories;
selecting the first audio clip based on numbers of feedback items in each of the two or more categories.

19. One or more non-transitory computer-readable storage media storing instructions which, when executed, cause:
concurrently generating a set of audience feeds viewed by live audience members viewing but not participating in a video game;
wherein each audience feed in the set of audience feeds includes video game content;
while playing the set of audience feeds:
receiving, from members of the live audience, by one or more computing devices, feedback data that represents items of feedback on one or more played portions of the content, wherein the items of feedback comprise:
a first audio clip of feedback recorded from a first member of the audience, and
a second audio clip of feedback recorded from a second member of the audience,
wherein the first member and the second member are at locations that are remote relative to each other;
wherein the content that is played to the audience includes an audio track;
based at least in part on stored triggering criteria for triggering a corresponding post-capture change and the feedback data, determining, by the one or more computing devices, whether to cause the corresponding post-capture change in the content that is played to the audience;
based at least in part on determining to cause the post-capture change in the content, causing the post-capture change in the content that is played to the audience by at least adding audio content from the first audio clip to the audio track.

20. The non-transitory computer-readable storage media of claim 19, wherein the instructions, when executed, further cause:
dividing the items of feedback represented in the feedback data into two or more categories;
selecting the first audio clip based on numbers of feedback items in each of the two or more categories.

21. A method comprising:
while content of a video game is concurrently generated and played to a live audience that is viewing but not participating in the video game:
receiving from members of the live audience, by one or more computing devices, feedback data that represents feedback items on one or more played portions of the content;
wherein the members of the live audience include a particular member that is associated with a particular spatial position within a virtual audience section;
wherein other members of the live audience are associated with respective spatial positions within the virtual audience section;
selecting, by the one or more computing devices, a subset of feedback items from other members of the live audience to present to the particular member based, at least in part, on the respective spatial position within the virtual audience section of the other members relative to the particular spatial position of the particular member; and
the one or more computing devices causing the subset of feedback items to be presented to the particular member while the particular member is viewing content of the video game;
wherein the respective spatial position within the virtual audience section of the other members of the live audience relative to the particular member is one of a plurality of factors used in selecting the subset, and the plurality of factors used to select the subset further includes at least one of:
which particular team the particular member supports relative to the respective teams supported by other members; or
a respective prominence value associated with the other members.

22. The method of claim 21 wherein the plurality of factors used to select the subset further includes which other members belong to a set of one or more virtual friends associated with the particular member.

23. The method of claim 21 wherein the plurality of factors used to select the subset includes which particular team the particular member supports relative to the respective teams supported by the other members.

24. The method of claim 21 wherein the plurality of factors used to select the subset includes a respective prominence value associated with the other members.

* * * * *